May 18, 1937.  F. C. MEYER ET AL  2,080,829
JOINT FOR ELECTRIC CABLES
Original Filed Sept. 12, 1932
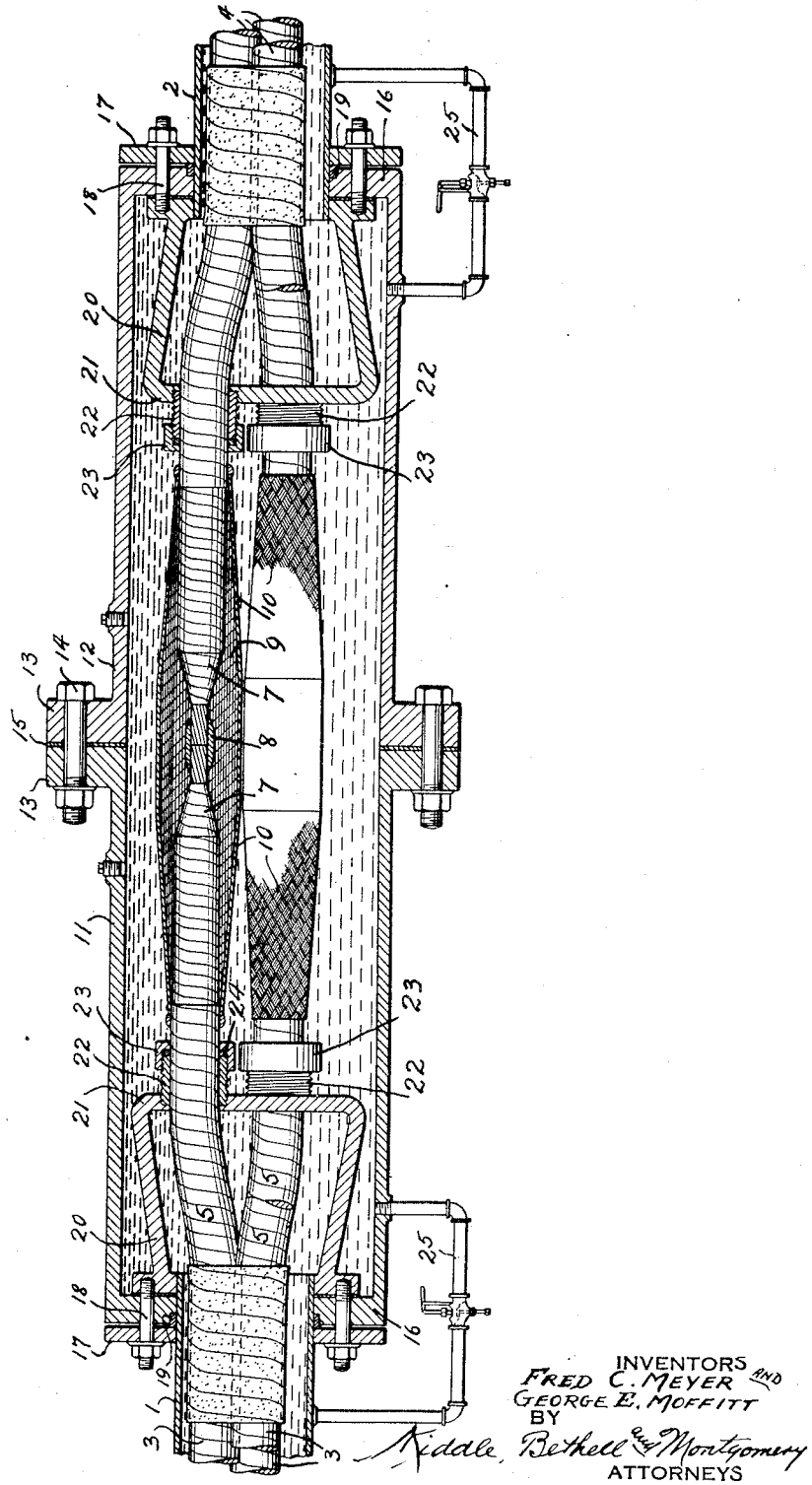
INVENTORS
FRED C. MEYER AND
GEORGE E. MOFFITT
BY
Riddle, Bethell & Montgomery
ATTORNEYS Patented May 18, 1937

2,080,829

UNITED STATES PATENT OFFICE 2,080,829

JOINT FOR ELECTRIC CABLES

Fred C. Meyer, Paterson, and George E. Moffitt, East Paterson, N. J., assignors to The Okonite-Callender Cable Company, Incorporated, Paterson, N. J., a corporation of New Jersey Original application September 12, 1932, Serial No. 632,754. Divided and this application March 30, 1935, Serial No. 13,820

1 Claim. (Cl. 247—3)

This invention relates to an improvement in joints for cables, the cables being of a type wherein a body of oil under high pressure is always maintained in contact with the exterior of the insulation of the cable, the cables being laid in a pipe maintained filled with oil under pressure or provided with a sheath of such a character as to provide a reservoir immediately about the insulation of the cable which is maintained filled with oil under high pressure at all times.

The drawing shows a sectional elevational view of one embodiment of the present invention as applied to a semi-stop joint.

Referring to the drawing in detail, it is to be assumed that 1 and 2 are the ends of two pipes of a cable system of the pressure type, i. e., a system in which the insulated cables are drawn into a pipe for example and the pipe kept filled with oil under pressure. The conductors are designated 3 and 4, respectively. Each conductor is paper insulated and over the paper is applied copper tape or braid 5. The adjacent ends of the cable lengths to be joined are pencilled as shown at 7 and the conductors united by a suitable connector 8. Over this splice or joint thus formed is wound paper, varnished cambric or other suitable insulating material 9 and on the exterior of this insulating material is applied metal braid 10 soldered or otherwise secured to the tape or braid 5.

11 and 12 designate the two cylindrical sections of the housing of the joint, these two sections being united to each other in a liquid-tight fashion by providing the same with flanges 13 bolted together by bolts 14 exterior of the casing, an intermediate gasket 15 being employed for insuring a liquid-tight joint. The outer extremities of these two housing sections 11 and 12 are provided with an inwardly extending flange 16 adapted to receive the pipes 1 and 2.

17 designates cap plates or follower rings bolted to the flanges 16 by bolts 18, a gasket 19 being employed intermediate the inwardly extending flanges 16 and the pipes 1 and 2 so that when the bolts 18 are drawn up a liquid-tight seal will be provided between the flanges 16 and the pipes 1 and 2.

The bolts 18 also maintain cup shaped caps 20 in place against the flanges 16, gasket 16' being provided intermediate the flanges and caps, the open end of these cup shaped caps receiving the pipes 1 and 2 as will be seen from the drawing. The closed end 21 of each of these caps is bored to permit of the passage therethrough of the ends of the cable to be joined and these bores are threaded to receive thimbles 22 which are slipped over the cables, these thimbles being a snug fit on the metal tape which as above mentioned is applied about the insulation of each conductor. On the ends of the thimbles 22 are caps 23 also snugly fitting the metal tape 5 of the conductors, a gasket 24 being interposed between these caps and the thimbles to make a liquid-tight seal.

The interior of the semi-stop joint thus provided is always filled with oil under the same pressure as the oil in the pipes 1 and 2, a pipe 25 being provided at each end of the semi-stop joint which communicates with the interior of the joint and with the interior of the pipes 1 and 2. These pipes are each equipped with automatic shut-off valves, as shown, of the type disclosed in copending application Serial No. 631,441, filed September 2, 1932 and now Patent 1,975,075, Oct. 2, 1934.

While we have illustrated and described one embodiment of our invention, it is to be understood that we do not wish to be limited to this precise structure as obviously various modifications and changes may be made therein without departing from the spirit and scope of the invention.

This application is a division of our copending application Serial No. 632,754 filed September 12, 1932.

What is claimed is:

A semi-stop joint for cables of the type in which the cable conductor is enclosed in a pipe line filled with oil under pressure, comprising in combination a joint casing filled with oil each end of said joint casing being provided with annular flange extending toward the cable pipe a cap plate surrounding the cable pipe at each end of the joint casing, barrier plates within the joint casing having integral portions extending toward the outer ends of the joint casing, the outer ends of said integral portions abutting the inwardly extending flanges on the joint casing, bolts for securing the said cap plates, casing flanges and barrier plates to each other to provide a liquid-tight seal between the ends of the joint casing and the cable pipe and to hold said barrier plates in place thimbles in the end wall of the cup-shaped members provided by the barrier plate construction for receiving the cables to be joined with a snug fit, said barrier plate construction preventing the flow of oil from the cable pipe or sheath through the barrier plate to the inside of the joint casing, and a pipe for maintaining communication between the oil in the cable pipe and the oil in the joint casing.

FRED C. MEYER.
GEORGE E. MOFFITT.